United States Patent
Sasada et al.

(10) Patent No.: US 10,053,587 B2
(45) Date of Patent: Aug. 21, 2018

(54) CONDUCTIVE FILM-FORMING COMPOSITION AND CONDUCTIVE FILM PRODUCING METHOD

(71) Applicant: FUJIFILM CORPORATION, Tokyo (JP)

(72) Inventors: Misato Sasada, Kanagawa (JP); Yuuichi Hayata, Kanagawa (JP); Yushi Hongo, Kanagawa (JP); Toshihiro Kariya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 133 days.

(21) Appl. No.: 14/807,654

(22) Filed: Jul. 23, 2015

(65) Prior Publication Data

US 2016/0024316 A1  Jan. 28, 2016

Related U.S. Application Data

(63) Continuation of application No. PCT/JP2014/051628, filed on Jan. 27, 2014.

(30) Foreign Application Priority Data

Feb. 4, 2013 (JP) ................. 2013-019432

(51) Int. Cl.
| | | |
|---|---|---|
| *H01B 1/22* | (2006.01) | |
| *C09D 5/24* | (2006.01) | |
| *C09D 5/00* | (2006.01) | |
| *C09D 139/06* | (2006.01) | |
| *C09D 171/02* | (2006.01) | |
| *C09D 201/00* | (2006.01) | |
| *C08L 39/06* | (2006.01) | |
| *H01B 13/00* | (2006.01) | |
| *C08K 3/20* | (2006.01) | |
| *C08L 71/02* | (2006.01) | |
| *C09D 7/40* | (2018.01) | |

(52) U.S. Cl.
CPC ............... *C09D 5/24* (2013.01); *C08K 3/20* (2013.01); *C08L 39/06* (2013.01); *C08L 71/02* (2013.01); *C09D 5/00* (2013.01); *C09D 7/40* (2018.01); *C09D 139/06* (2013.01); *C09D 171/02* (2013.01); *C09D 201/00* (2013.01); *H01B 1/22* (2013.01); *H01B 13/0026* (2013.01)

(58) Field of Classification Search
CPC ... H01B 1/00; H01B 1/08; H01B 1/14; H01B 1/20; B05D 5/12; C09D 5/24
See application file for complete search history.

(56) References Cited

U.S. PATENT DOCUMENTS

| | | | | |
|---|---|---|---|---|
| 7,767,721 B2 * | 8/2010 | Maruyama | ............... | C01G 3/02 106/31.65 |
| 2005/0069648 A1 * | 3/2005 | Maruyama | .............. | C23C 24/08 427/379 |
| 2006/0098065 A1 * | 5/2006 | Maruyama | ............... | C01G 3/02 347/100 |
| 2014/0127409 A1 * | 5/2014 | Harada | .................... | H01B 1/22 427/331 |

FOREIGN PATENT DOCUMENTS

| | | | |
|---|---|---|---|
| EP | 2163890 A1 * | 3/2010 | |
| JP | H05-174620 A | 7/1993 | |
| JP | H06-116407 A | 4/1994 | |
| JP | H06-320617 A | 11/1994 | |
| JP | 2001-011388 A | 1/2001 | |
| JP | 2004-155638 A | 6/2004 | |
| JP | 2005-211732 A | 8/2005 | |
| JP | 2012-151093 A | 8/2012 | |
| WO | 2010/110969 A1 | 9/2010 | |

OTHER PUBLICATIONS

English language machine translation of JP 2001-011388 (pub date Jan. 2001).*
Nanoparticles and Dispersions Alfa Aesar data sheet (no pub date) quimica.com.*
The extended European search report issued by the European Patent Office dated Dec. 4, 2015, which corresponds to European Patent Application No. 14745507.5-1301 and is related to U.S. Appl. No. 14/807,654.
An Office Action; "Notification of Reasons for Refusal," issued by the Japanese Patent Office dated Apr. 12, 2016, which corresponds to Japanese Patent Application No. 2013-019432 and is related to U.S. Appl. No. 14/807,654; with English language translation.
An Office Action issued by the Taiwanese Patent Office dated Mar. 1, 2017, which corresponds to Taiwanese Patent Application No. 1031033272 and is related to U.S. Appl. No. 14/807,654; with English language translation.
Notification of Transmittal of Translation of the International Preliminary Report on Patentability and Translation of Written Opinion of the International Searching Authority; PCT/JP2014/051628 dated Aug. 13, 2015.
International Search Report, PCT/JP2014/051628, dated Apr. 28, 2014.
An Office Action issued by the European Patent Office dated Jun. 11, 2018, which corresponds to EP14745507.5-1107 and is related to U.S. Appl. No. 14/807,654.

* cited by examiner

*Primary Examiner* — Mark T Kopec
(74) *Attorney, Agent, or Firm* — Studebaker & Brackett PC

(57) ABSTRACT

In a conductive film-forming composition including copper oxide particles, water and a dispersant selected from the group consisting of a water-soluble polymer and a surfactant, the copper oxide particles have a volume average secondary particle size of 20 to 240 nm, and the copper oxide particles are contained in an amount of 10 to 70 wt % with respect to a total weight of the conductive film-forming composition.

17 Claims, No Drawings

CONDUCTIVE FILM-FORMING COMPOSITION AND CONDUCTIVE FILM PRODUCING METHOD

CROSS-REFERENCE TO RELATED APPLICATIONS

This application is a Continuation of PCT International Application No. PCT/JP2014/051628 filed on Jan. 27, 2014, which claims priority under 35 U.S.C. § 119(a) to Japanese Patent Application No. 2013-019432 filed on Feb. 4, 2013. Each of the above application(s) is hereby expressly incorporated by reference, in its entirety, into the present application.

BACKGROUND OF THE INVENTION

The present invention relates to a conductive film-forming composition, particularly to a conductive film-forming composition containing copper oxide particles with a predetermined volume average secondary particle size.

The present invention also relates to a conductive film producing method, particularly to a conductive film producing method using the foregoing conductive film-forming composition.

As a method for forming a metal film on a substrate, there is known a technique of forming an electrically conductive part such as a metal film or interconnects in a circuit board by applying a metal particle or metal oxide particle dispersion onto a substrate by a printing method, followed by heating treatment or light irradiation treatment for sintering.

High expectations are placed on the method above in the field of next generation electronics development because this is a simple, energy-saving and resource-saving method compared to conventional interconnect fabricating methods using a high temperature vacuum process (sputtering) or plating.

For example, JP 2004-155638 A discloses in Examples a metal oxide dispersion containing cuprous oxide particles and diethylene glycol, and this dispersion is used to form copper interconnections.

SUMMARY OF THE INVENTION

Meanwhile, in recent years, interconnects in printed circuit boards or the like are further miniaturized and integrated in order to meet a demand for downsizing and higher functionality of electronic devices. Accordingly, further improvement of metal interconnects in electrical conductivity characteristics is required.

The present inventors have formed a conductive film with the use of the metal oxide dispersion containing an organic dispersion medium such as diethylene glycol described in JP 2004-155638 A and found that the obtained conductive film does not have the electrical conductivity at the presently required level and therefore needs further improvement. In addition, since many voids are present in the obtained conductive film, the conductive film is brittle and is easily broken.

In view of the above, an object of the present invention is to provide a conductive film-forming composition which enables formation of a conductive film having less voids and exhibiting excellent electrical conductivity.

Another object of the present invention is to provide a conductive film producing method using the conductive film-forming composition.

The present inventors have made an intensive study on the problems of the related art and as a result found that the problems can be solved by the use of a composition containing copper oxide particles having a volume average secondary particle size falling within a predetermined range, a dispersant selected from the group consisting of a water-soluble polymer and a surfactant, and water as a solvent.

Specifically, the inventors found that the objects can be achieved by the characteristic features described below.

(1) A conductive film-forming composition comprising copper oxide particles, water and a dispersant selected from the group consisting of a water-soluble polymer and a surfactant, wherein the copper oxide particles have a volume average secondary particle size of 20 to 240 nm, and wherein the copper oxide particles are contained in an amount of 10 to 70 wt % with respect to a total weight of the conductive film-forming composition.

(2) The conductive film-forming composition according to (1), further comprising a thixotropic agent.

(3) The conductive film-forming composition according to (1) or (2), wherein the dispersant contains two or more types of water-soluble polymers different in weight-average molecular weight.

(4) The conductive film-forming composition according to (1) or (2), wherein the dispersant contains a water-soluble polymer and a surfactant.

(5) The conductive film-forming composition according to any one of (1) to (4), wherein the dispersant contains polyvinylpyrrolidone with a weight-average molecular weight of 8000 to 160000 or polyethylene glycol with a weight-average molecular weight of 3000 to 18000.

(6) The conductive film-forming composition according to any one of (1) to (5), wherein the dispersant is contained in an amount of 4 to 20 wt % with respect to a total weight of the copper oxide particles.

(7) The conductive film-forming composition according to any one of (1) to (6), wherein the copper oxide particles have a volume average secondary particle size of 20 to 180 nm.

(8) A conductive film producing method, comprising:

a step of forming a coating by applying the conductive film-forming composition according to any one of (1) to (7) onto a substrate; and a step of forming a metallic copper-containing conductive film by performing heating treatment and/or light irradiation treatment on the coating to reduce the copper oxide particles.

According to the invention, it is possible to provide a conductive film-forming composition which enables formation of a conductive film having less voids and exhibiting excellent electrical conductivity.

According to the invention, a conductive film producing method using the conductive film-forming composition can also be provided.

DETAILED DESCRIPTION OF THE INVENTION

A preferred embodiment of the conductive film-forming composition and the conductive film producing method of the invention is described in detail below.

Details of characteristic features of the invention are first described in comparison with the related art.

As described above, the characteristic features of the invention include the use of copper oxide particles having a volume average secondary particle size falling within a predetermined range, the use of a dispersant selected from the group consisting of a water-soluble polymer and a surfactant and the use of water as a solvent. With a volume average secondary particle size falling within a predetermined range, the copper oxide particles are packed more densely in a coating (precursor film) which is formed from the conductive film-forming composition and which has not yet undergone heating treatment or light irradiation treatment. The use of a dispersant selected from the group consisting of a water-soluble polymer and a surfactant promotes still denser packing of the copper oxide particles. Furthermore, it is assumed that the use of water as a solvent allows the coating to be even still denser due to, for instance, hydrogen bonding of the solvent, the water-soluble polymer or the like, thus promoting packing of the copper oxide particles. As a result, the heat conduction among the copper oxide particles during heating treatment or light irradiation treatment is improved, whereby copper oxide is more efficiently reduced to metallic copper.

In addition, water is used in the conductive film-forming composition of the invention, resulting in a high degree of safety.

First, various ingredients (copper oxide particles, water-soluble polymer, surfactant and the like) of the conductive film-forming composition are detailed and then, the conductive film producing method is detailed below.

(Copper Oxide Particles)

The conductive film-forming composition contains copper oxide particles. The copper oxide particles are reduced through heating treatment or light irradiation treatment, which will be described later, and constitute metallic copper in a conductive film.

The term "copper oxide" in the invention refers to a compound substantially free from unoxidized copper and more specifically, a compound with which a peak derived from copper oxide is detected and at the same time, a peak derived from metal is not detected in X-ray crystallography. The phrase "substantially free from copper" refers, but is not limited, to a copper content of up to 1 wt % with respect to the copper oxide particles.

The copper oxide is preferably copper(I) oxide or copper (II) oxide and more preferably copper(II) oxide because it is available at low cost and stable.

The copper oxide particles have a volume average secondary particle size of 20 to 240 nm. The volume average secondary particle size is preferably 20 to 180 nm, more preferably 50 to 160 nm and even more preferably more than 100 nm but not more than 160 nm because the resultant conductive film has more excellent electrical conductivity.

At a volume average secondary particle size of the copper oxide particles of less than 20 nm, the copper oxide particles have poor dispersion stability in the conductive film-forming composition and the conductive film will have lower electrical conductivity. At a volume average secondary particle size of the copper oxide particles of more than 240 nm, many voids are to be present in the resultant conductive film, which will deteriorate the handleability and the durability of the conductive film and lower the electrical conductivity.

A method of measuring the volume average secondary particle size of the copper oxide particles is as follows: The conductive film-forming composition is diluted with ion-exchanged water so as to have a copper oxide concentration (copper oxide particle concentration) of 0.01 wt % (% by weight), and the volume average secondary particle size is measured by dynamic light scattering with a Nanotrac particle size distribution measuring device UPA-EX150 (manufactured by Nikkiso Co., Ltd.).

A method of controlling the volume average secondary particle size of the copper oxide particles is not particularly limited and for instance, any of known methods is selected such as a method in which a type of a dispersant for use is controlled, a method in which mixing conditions (mixing method, mixing procedure) of a dispersant and the copper oxide particles are controlled, a method in which a disperser for use or dispersing time is changed, and a method in which a mixing ratio of the copper oxide particles, a dispersant and a solvent (water) is controlled.

The average primary particle size of the copper oxide particles is not particularly limited and is preferably up to 100 nm, more preferably up to 80 nm, even more preferably up to 50 nm and particularly preferably less than 50 nm. The lower limit of the average primary particle size is not particularly limited and is preferably at least 1 nm and more preferably at least 10 nm.

It is preferable for the average primary particle size to be at least 1 nm because the particles have moderate activity at their surfaces, do not dissolve in the composition and are excellent in handleability. It is also preferable for the average primary particle size to be up to 100 nm because patterning is easily made for interconnects and the like by any of various printing processes using the composition as the ink composition for inkjet printing or as the paste composition for screen printing, the copper oxide is sufficiently reduced to metallic copper when the composition is formed into a conductor, and the resultant conductive film has excellent electrical conductivity.

The average primary particle size is determined by measuring equivalent circle diameters of at least 400 copper oxide particles through transmission electron microscopy (TEM) observation or scanning electron microscopy (SEM) observation and calculating the arithmetic mean of the measurements. The term "equivalent circle diameter" refers to a diameter of a circle equivalent in area to the two-dimensional shape of each copper oxide particle observed.

As to the average primary particle size and the volume average secondary particle size of the copper oxide particles, the ratio of the average primary particle size/the volume average secondary particle size is preferably 0.1 to 0.7, and more preferably 0.25 to 0.5 because the resultant conductive film has more excellent electrical conductivity.

The copper oxide particles described above may be a commercial product or may be produced by any known production method.

(Water)

The conductive film-forming composition contains water. The water serves as a dispersion medium of the copper oxide particles. The use of water as a solvent is favorable in terms of its high degree of safety. In addition, as described above, it is assumed that hydrogen bonding of the solvent, a water-soluble polymer or the like, or another factor, allows the copper oxide particles to be more densely packed in formation of a coating and consequently, a conductive film having less voids and excellent electrical conductivity is formed.

The water for use preferably has a purity at the ion exchanged water level.

The conductive film-forming composition may contain another solvent (e.g., organic solvent) than the water as long as the effect of the invention is not impaired.

(Water-Soluble Polymer, Surfactant)

The conductive film-forming composition contains a dispersant selected from the group consisting of a water-soluble polymer and a surfactant. Since the dispersant is contained, the copper oxide particles described above are allowed to have improved dispersion stability, to be packed more densely in the resultant coating which is formed from the conductive film-forming composition, and to be reduced to metallic copper more efficiently. As a result, the resultant conductive film has less voids and improved electrical conductivity.

The type of the water-soluble polymer is not particularly limited as long as it is a polymer that can dissolve in water.

Examples of the water-soluble polymer include vegetable polymers, microbial polymers and synthetic/semisynthetic polymers, with the vegetable polymers exemplified by xanthan gum, gum arabic, tragacanth gum, galactan, guar gum, carob gum, karaya gum, carrageenan, pectin, agar, quince seed (Cydonia oblonga), algae colloid (brown algae extract), starch (rice, corn, potato, wheat) and glycyrrhizic acid; and the microbial polymers exemplified by dextran, succinoglucan and pullulan.

Exemplary semisynthetic water-soluble polymers include starch polymers (e.g., carboxymethyl starch, methyl hydroxypropyl starch, and the like); cellulose polymers (methyl cellulose, ethyl cellulose, methyl hydroxypropyl cellulose, hydroxyethyl cellulose, sodium cellulose sulfate, hydroxypropyl cellulose, carboxymethyl cellulose, carboxymethylcellulose sodium, crystalline cellulose, cellulose powder, and the like); alginic acid polymers (e.g., sodium alginate, propylene glycol alginate, and the like).

Exemplary synthetic water-soluble polymers include vinyl polymers (e.g., carboxyvinyl polymer (carbomer), polyvinyl alcohol, polyvinyl methyl ether, polyvinylpyrrolidone, polymaleic acid, polyitaconic acid, polyfumaric acid, poly(p-styrene carboxylic acid), and the like); polyoxyethylene polymers (e.g., polyethylene glycol, polypropylene glycol, and the like); acrylic polymers (e.g., polyacrylic acid, polymethacrylic acid, polyethyl acrylate, sodium polyacrylate, polyacrylamide); polyethyleneimines; and cationic polymers.

Preferred examples of the water-soluble polymer include polyvinylpyrrolidone, polyethylene glycol, polyvinyl alcohol and acrylic copolymers. The use of any of these polymers ensures more excellent electrical conductivity of the resultant conductive film.

The weight-average molecular weight of the polyvinylpyrrolidone is not particularly limited and is preferably 2500 to 160000, more preferably 8000 to 160000 and even more preferably 20000 to 80000 because the resultant conductive film has more excellent electrical conductivity.

The weight-average molecular weight of the polyethylene glycol is not particularly limited and is preferably 3000 to 40000, more preferably 3000 to 18000 and even more preferably 5000 to 18000 because the resultant conductive film has more excellent electrical conductivity.

The weight-average molecular weight of the polyvinyl alcohol is not particularly limited and is preferably 2500 to 40000 and more preferably 3000 to 20000 because the resultant conductive film has more excellent electrical conductivity.

Exemplary acrylic copolymers include commercially available BYK-154, DISPERBYK-2010 and DISPERBYK-2015 manufactured by BYK Japan KK.

The weight-average molecular weight is a polystyrene-equivalent value obtained by a GPC method (solvent: N-methylpyrrolidone).

The type of the surfactant is not particularly limited and exemplary surfactants include anionic surfactants, nonionic surfactants, cationic surfactants and amphoteric surfactants.

Specific examples of the anionic surfactants include fatty acid salts, alkyl sulfate ester salts, alkylbenzenesulfonates, alkylnaphthalenesulfonates, alkyl sulfosuccinates, alkyl diphenyl ether disulfonates, alkyl phosphates, polyoxyethylene alkyl sulfate ester salts, polyoxyethylene alkylallyl sulfate ester salts, naphthalene sulfonate formalin condensates, polycarboxylic acid type polymeric surfactants, and polyoxyethylene alkyl phosphate esters.

Typical polycarboxylic acid type polymeric surfactants include, for instance, a polymer of a carboxylic acid monomer having an unsaturated double bond as exemplified by acrylic acid, methacrylic acid, maleic acid, fumaric acid and itaconic acid, and a copolymer of a carboxylic acid monomer having an unsaturated double bond and another monomer having an unsaturated double bond, as well as ammonium salts and amine salts thereof. A preferred example of the polycarboxylic acid type polymeric surfactant is a polyacrylic acid-based dispersant, and more preferred is a polymeric dispersant in which an ammonium salt of acrylic acid is a constitutional unit of a copolymer ingredient.

Specific examples of the polycarboxylic acid type polymeric surfactants include a sodium salt of a copolymer of isobutylene or diisobutylene and maleic anhydride, a sodium salt of a copolymer of maleic anhydride and styrene, a sodium salt of an acrylic acid polymer, a sodium or ammonium salt of a copolymer of maleic anhydride and acrylic acid, and a sodium or ammonium salt of a copolymer of itaconic acid and acrylic acid.

Specific examples of the nonionic surfactants include polyoxyethylene alkyl ethers, polyoxyethylene alkyl allyl ethers, polyoxyethylene derivatives, oxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, and alkyl alkanolamides.

More specific examples thereof include polyoxyethylene oleyl ethers, polyoxyethylene stearyl ethers, and polyoxyethylene lauryl ethers.

Specific examples of the cationic surfactants and the amphoteric surfactants include alkylamine salts, quaternary ammonium salts, alkyl betaines, and amine oxides.

Among the foregoing surfactants, the anionic surfactants and the nonionic surfactants are preferred because the resultant conductive film has more excellent electrical conductivity.

In particular, the polycarboxylic acid type polymeric surfactants are preferred as the anionic surfactants.

The polyoxyethylene alkyl ethers are preferred as the nonionic surfactants.

The conductive film-forming composition may contain both the water-soluble polymer and the surfactant.

When the conductive film-forming composition contains the water-soluble polymer, two or more different types of water-soluble polymers may be contained. For example, two or more types of water-soluble polymers different in weight-average molecular weight are preferably contained because the present invention can have more excellent effects.

When the conductive film-forming composition contains the surfactant, two or more different types of surfactants may be contained.

(Other Ingredients)

The conductive film-forming composition may contain other ingredients than the copper oxide particles, the water, the water-soluble polymer and the surfactant described above.

For instance, a thixotropic agent may be contained in order to control the viscosity of the conductive film-forming composition in an appropriate range. Thixotropic agents may be used singly or in combination of two or more.

The thixotropic agent is an additive that imparts thixotropy to a dispersion medium. The term "thixotropy" refers to the property of fluid that when force acts on fluid, the viscosity of the fluid is decreased while when the fluid is allowed to stand, the viscosity is restored.

Exemplary thixotropic agents include organic thixotropic agents and inorganic thixotropic agents. Examples of the organic thixotropic agents include fatty acid amide thixotropic agents, hydrogenated castor oil thixotropic agents, polyolefin oxide thixotropic agents, urea thixotropic agents, and urethane thixotropic agents. More specific examples thereof include urea urethanes, modified ureas, polyhydroxycarboxylic acid amides, polyhydroxycarboxylic acid esters, urea-modified polyamides, oxidized polyethylene amides, oxidized polyethylenes, and fatty acid amides.

Exemplary commercial products of the fatty acid amide thixotropic agents include DISPARLON 6900-20X, 6900-10X, A603-20X, A603-10X, 6810-20X, 6850-20X, FS-6010, PFA-131, PFA-231, 6500, 6650, 6700, F-9020, F-9030, F-9040 and F-9050 manufactured by Kusumoto Chemicals, Ltd., and BYK-405 manufactured by BYK Japan KK. Exemplary commercial products of the hydrogenated castor oil thixotropic agents include DISPARLON 308 and 4300 manufactured by Kusumoto Chemicals, Ltd. Exemplary commercial products of the polyolefin oxide thixotropic agents include DISPARLON 4200-20, 4200-10, PF-911, 4401-25X and 4401-25M manufactured by Kusumoto Chemicals, Ltd. Exemplary commercial products of the urea thixotropic agents and the urethane thixotropic agents include BYK-410, BYK-411, BYK-420, BYK-425, BYK-428, BYK-430 and BYK-431 manufactured by BYK Japan KK.

(Conductive Film-Forming Composition)

The conductive film-forming composition contains the copper oxide particles, the water and the dispersant described above.

The copper oxide particle content is 10 to 70 wt % with respect to the total weight of the conductive film-forming composition. In particular, the copper oxide particle content is preferably 20 to 70 wt %, more preferably 30 to 65 wt % and even more preferably 40 to 65 wt % because the resultant conductive film has more excellent electrical conductivity.

At a copper oxide particle content of less than 10 wt %, the resultant conductive film tends to be nonuniform and at a copper oxide particle content of more than 70 wt %, the resultant conductive film has poor electrical conductivity.

The water content is not particularly limited and is preferably from 15 to 88 wt %, more preferably from 20 to 75 wt %, and even more preferably from 25 to 55 wt % with respect to the total weight of the conductive film-forming composition in terms of excellent storage stability of the conductive film-forming composition.

The dispersant content is not particularly limited and is preferably from 2 to 20 wt %, more preferably from 4 to 20 wt %, and even more preferably from 6 to 15 wt % with respect to the total weight of copper oxide particles in terms of excellent storage stability of the conductive film-forming composition.

When the conductive film-forming composition contains both the water-soluble polymer and the surfactant, the surfactant content is preferably up to 10 wt % and more preferably up to 5 wt % with respect to the total weight of copper oxide particles. The lower limit thereof is not particularly limited and is often 0.5 wt % or more.

When the conductive film-forming composition contains the thixotropic agent described above, the thixotropic agent content is not particularly limited and is preferably 0.1 to 5 wt % and more preferably 0.5 to 3 wt % with respect to the total weight of the conductive film-forming composition in terms of excellent porosity of the resultant conductive film.

The pH of the conductive film-forming composition is not particularly limited and is preferably up to 9 and more preferably up to 7 and preferably at least 4 and more preferably at least 5 in terms of more excellent dispersion stability of the copper oxide particles.

The method of producing the conductive film-forming composition is not particularly limited and any known method may be employed.

In particular, the copper oxide particles, the water, the dispersant and other optional ingredients described above can be mixed to thereby produce the conductive film-forming composition.

The mixing method is not particularly limited and exemplary methods include a mixing and dispersing method using a homogenizer (e.g., ultrasonic homogenizer, high-pressure homogenizer), a mill (e.g., bead mill, ball mill, tower mill, three-roll mill), a mixer (planetary mixer, dispersion mixer, Henschel mixer, kneader, Clearmix, planetary centrifugal mixer (stirring deaerator)), or the like. Of these, the ultrasonic homogenizer or the bead mill is preferably used in terms of more excellent dispersibility of the copper oxide particles.

The material, amount and diameter of beads are not particularly limited as long as they fall within ranges suitable for a normal bead mill. The bead diameter is preferably about 0.05 mm to about 3 mm.

(Conductive Film Producing Method)

The conductive film producing method of the invention comprises a step of forming a coating on a substrate using the above-described conductive film-forming composition (hereinafter also called "coating formation step" as appropriate) and a step of obtaining a conductive film by performing heating treatment and/or light irradiation treatment (hereinafter also called "conductive film formation step"). The respective steps are described in detail below.

(Coating Formation Step)

This step is a step in which the above-described conductive film-forming composition is applied onto a substrate to form a coating. By this step, a precursor film before reduction treatment is obtained.

The conductive film-forming composition for use is as described above.

Any known substrate may be employed as the substrate used in this step. Exemplary materials of the substrate include resin, paper, glass, silicon-based semiconductors, compound semiconductors, metal oxides, metal nitrides, wood and composites thereof.

More specific examples thereof include resin substrates composed of such materials as polyolefin resins exemplified by low density polyethylene resin, high density polyethylene resin, polypropylene and polybutylene; methacrylic resins exemplified by polymethyl methacrylate; polystyrene resins exemplified by polystyrene, ABS and AS; acrylic resins; polyester resins (polyethylene terephthalate, polybutylene terephthalate, polyethylene naphthalate, poly(1,4-cyclohexyldimethylene terephthalate) and the like); polyamide resins selected from among nylon resins and nylon copolymers; polyvinyl chloride resins; polyoxymethylene resins; polycarbonate resins; polyphenylene sulfide resins; modified polyphenylene ether resins; polyacetal resins; polysulphone resins; polyethersulfone resins; polyketone resins; polyether nitrile resins; polyether ether ketone resins; polyetherimide resins, polyether ketone resins, polyether ketone ketone resins; polyimide resins; polyamide-imide resins; fluororesins; and cellulose derivatives; paper substrates composed of such materials as uncoated printing paper, ultralight weight coated printing paper, coated printing paper (art paper, coated paper), special printing paper, copy paper (PPC paper), unbleached wrapping paper (unglazed shipping sacks kraft paper, unglazed kraft paper), bleached wrapping paper (bleached kraft paper, machine glazed poster paper), coated board, chipboard and corrugated fiberboard; glass substrates composed of such materials as soda-lime glass, borosilicate glass, silica glass and quartz glass; silicon-based semiconductor substrates composed of such materials as amorphous silicon and polysilicon; compound semiconductor substrates composed of such materials as CdS, CdTe and GaAs; metal substrates composed of such materials as copper plate, iron plate and aluminum plate; other inorganic substrates composed of such materials as alumina, sapphire, zirconia, titania, yttrium oxide, indium oxide, ITO (indium tin oxide), IZO (indium zinc oxide), NESA (tin oxide), ATO (antimony-doped tin oxide), fluorine-doped tin oxide, zinc oxide, AZO (aluminum-doped zinc oxide), gallium-doped zinc oxide, aluminum nitride substrate and silicon carbide; and composite substrates composed of such materials as paper-resin composites exemplified by paper-phenolic resin, paper-epoxy resin and paper-polyester resin composites and glass-resin composites exemplified by glass cloth-epoxy resin, glass cloth-polyimide resin and glass cloth-fluororesin composites. Of these, a polyester resin substrate, a polycarbonate resin substrate, a polyimide resin substrate and a polyetherimide resin substrate are preferably used.

The method of applying the conductive film-forming composition onto the substrate is not particularly limited and any known method may be employed. Examples of the method include a screen printing process, a dip coating process, a spray coating process, a spin coating process, an inkjet process and other coating processes.

The coating is not particularly limited in shape and may be in a planar shape covering the entire surface of the substrate or in a pattern shape (e.g., in the shape of interconnects or dots).

The amount of the conductive film-forming composition applied onto the substrate may be appropriately adjusted according to the desired thickness of the conductive film. In general, the coating thickness is preferably 0.01 to 5,000 µm, more preferably 0.1 to 1,000 µm, and even more preferably 1 to 100 µm.

In this step, drying treatment may follow the application of the conductive film-forming composition onto the substrate in order to remove water which is a solvent, as necessary. It is preferable to remove the remaining solvent because the generation of fine cracks and voids, which is caused by the expansion of the solvent at vaporization, can be suppressed in the conductive film formation step to be described later, resulting in excellent electrical conductivity of the conductive film and good adhesion between the conductive film and the substrate.

Drying treatment may be performed with a hot air dryer and heating treatment is performed at a temperature of preferably 40° C. to 200° C., more preferably 50° C. or more but less than 150° C., and even more preferably 70° C. to 120° C.

The drying time is not particularly limited and is preferably 1 to 60 minutes because of more excellent adhesion between the substrate and the conductive film.
(Conductive Film Formation Step)

This step is a step in which the coating obtained in the foregoing coating formation step is subjected to heating treatment and/or light irradiation treatment to thereby form a metallic copper-containing conductive film.

Owing to heating treatment and/or light irradiation treatment, copper oxide in the copper oxide particles is reduced and fusion bonded, thereby obtaining metallic copper. More specifically, the copper oxide is reduced to form metallic copper particles and the formed metallic copper particles are fusion bonded to each other to form grains, which are further adhered and fusion bonded to each other to form a conductive thin film.

For the heating treatment, optimal conditions are appropriately selected according to the types of the copper oxide particles and the dispersant for use. In particular, the heating temperature is preferably 100 to 500° C. and more preferably 150 to 450° C. and the heating time is preferably 5 to 120 minutes and more preferably 10 to 60 minutes because the conductive film with less voids and more excellent electrical conductivity can be formed in a short time.

The heating means is not particularly limited and any known means may be employed such as an oven and a hot plate.

In the present invention, the conductive film can be formed by heating treatment at a relatively low temperature and this is advantageous in terms of low process cost.

Different from the above-described heating treatment, the light irradiation treatment irradiates a portion applied with the coating with light at room temperature for a short time to enable reduction of copper oxide to metallic copper and its sintering. This treatment enables the substrate to avoid deterioration caused by prolonged heating and allows the conductive film and the substrate to have more excellent adhesion.

The light source for use in the light irradiation treatment is not particularly limited and exemplary light sources include mercury lamp, metal halide lamp, xenon lamp, chemical lamp and carbon arc lamp. Examples of the radiation include electron rays, X-rays, ion beams and far infrared rays, and g-line rays, i-line rays, deep UV rays and high-density energy beams (laser beams) may also be used.

Preferred specific embodiments include scanning exposure with an infrared laser, high-intensity flash exposure with a xenon discharge lamp, and exposure with an infrared lamp.

The light irradiation is performed preferably with a flash lamp, and pulsed light irradiation (e.g., pulsed light irradiation using a Xe flash lamp) is more preferred. The irradiation with high-energy pulsed light is capable of intensively heating a surface at the portion applied with the coating in an extremely short time and therefore, heat affects the substrate to a minor extent.

The pulsed light has an irradiation energy of preferably 1 to 100 J/cm$^2$ and more preferably 1 to 30 J/cm$^2$ and a pulse width of preferably 1 µs to 100 ms and more preferably 10 µs to 10 ms. The pulsed light irradiation time is preferably 1 to 100 ms, more preferably 1 to 50 ms and even more preferably 1 to 20 ms.

The heating treatment and the light irradiation treatment described above may be carried out alone or together at the same time. Alternatively, either one of the treatments may be followed by the other one.

The atmosphere suitable for the heating treatment and the light irradiation treatment is not particularly limited, and examples thereof include an air atmosphere, an inert atmosphere and a reducing atmosphere. The inert atmosphere refers to an atmosphere filled with an inert gas such as argon, helium, neon or nitrogen, and the reducing atmosphere refers to an atmosphere in which a reducing gas such as hydrogen or carbon monoxide is present.

The treatments are preferably performed in the inert atmosphere or the reducing atmosphere and in particular, the reducing atmosphere is more preferred for the heating treatment.

(Conductive Film)

The metallic copper-containing conductive film (metallic copper film) is obtained through the foregoing steps.

The thickness of the conductive film is not particularly limited and is appropriately adjusted to an optimal film thickness according to the intended use. In particular, the conductive film has a thickness of preferably 0.01 to 1,000 μm and more preferably 0.1 to 100 μm for use in a printed circuit board.

The film thickness is a value (average) obtained by measuring the conductive film thickness in any three or more places and calculating the arithmetic mean of the measurements.

The conductive film has a volume resistivity of preferably less than 100 μΩ·cm and more preferably less than 50 μΩ·cm in terms of electrical conductivity characteristics.

The volume resistivity can be calculated by measuring the surface resistivity of the conductive film by a four point probe method and then multiplying the obtained surface resistivity by the film thickness.

The conductive film may be provided over the entire surface of the substrate or in a pattern shape. The patterned conductive film is useful as conductor interconnects (interconnects) of a printed circuit board or the like.

Exemplary methods for obtaining the patterned conductive film includes a method which involves applying the conductive film-forming composition onto the substrate in a pattern shape, followed by the heating treatment and/or the light irradiation treatment and a method which involves etching the conductive film provided over the entire surface of the substrate in a pattern shape.

The etching method is not particularly limited and for example, a known subtractive or semi-additive method may be employed.

In cases where the patterned conductive film is configured as a multilayer circuit board, an insulating layer (insulating resin layer, interlayer dielectric film, solder resist) may be further formed on the surface of the patterned conductive film and further interconnects (metal pattern) may be formed on the surface thereof.

The material of the insulating film is not particularly limited and examples thereof include epoxy resin, glass epoxy resin, aramid resin, crystalline polyolefin resin, amorphous polyolefin resin, fluorine-containing resins (polytetrafluoroethylene, perfluorinated polyimide, perfluorinated amorphous resin and the like), polyimide resin, polyethersulfone resin, polyphenylene sulfide resin, polyether ether ketone resin and liquid crystal resin.

Among these, the insulating film preferably contains epoxy resin, polyimide resin or liquid crystal resin and more preferably epoxy resin in terms of adhesion, dimension stability, heat resistance and electrical insulating properties. One specific example is ABF-GX13 manufactured by Ajinomoto Fine-Techno Co., Inc.

The solder resist that may be employed as a material of the insulating layer used for protecting interconnects is described in, for example, JP 10-204150 A and JP 2003-222993 A in detail, and the materials of the solder resist stated therein are applicable to the present invention as desired. Commercial products may be used for the solder resist and specific examples thereof include PFR800 and PSR4000 (trade names) manufactured by Taiyo Ink Mfg. Co., Ltd. and SR7200G manufactured by Hitachi Chemical Company, Ltd.

The substrate having the thus obtained conductive film (conductive film-carrying substrate) can be used in various applications, as exemplified by a printed circuit board, a TFT, an FPC and an RFID.

EXAMPLES

The invention is described below in further detail by way of examples. However, the invention should not be construed as being limited to the following examples.

Example 1

(Dispersion 2)

Mixed were 116 parts by weight of copper(II) oxide particles (manufactured by C. I. Kasei Company, Limited; NanoTek CuO; average primary particle size (48 nm)), 7 parts by weight of polyvinylpyrrolidone (manufactured by Tokyo Chemical Industry Co., Ltd.; PVP K15) and 77 parts by weight of ion-exchanged water, and the mixture was dispersed in a ready mill disperser (bead mill disperser manufactured by Aimex Co., Ltd.) with zirconia beads having a bead diameter of 0.05 mm to a desired volume average secondary particle size, thereby obtaining a dispersion 2.

The dispersion 2 was diluted with ion-exchanged water to a copper(II) oxide concentration (copper(II) oxide particle concentration) of 0.01 wt %. The volume average secondary particle size of the dispersion as measured by dynamic light scattering with a Nanotrac particle size distribution measuring device UPA-EX150 (manufactured by Nikkiso Co., Ltd.) was 130 nm. The weight-average molecular weight of the polyvinylpyrrolidone was 3000 as stated in the "weight-average molecular weight of water-soluble polymer" field in Table 1.

(Preparation of Conductive Film-Forming Composition 2)

The above-described dispersion 2, a water-soluble polymer (polyvinylpyrrolidone (manufactured by Tokyo Chemical Industry Co., Ltd.; PVP K15)), water and BYK-425 (thixotropic agent; manufactured by BYK Japan KK; solid content concentration: 40 wt %) were mixed to have the compositional ratio shown in Table 2, and the mixture was stirred at 2000 rpm for 5 minutes in a planetary centrifugal mixer (manufactured by Thinky Corporation; THINKY MIXER ARE-310) to thereby obtain a conductive film-forming composition 2. The polyvinylpyrrolidone amount shown in Table is a total amount of the polyvinylpyrrolidone contained in the dispersion 2 and polyvinylpyrrolidone added during preparation of the conductive film-forming composition 2. The volume average secondary particle size of the copper(II) oxide particles in the conductive film-forming composition 2 was measured in the same manner as for the above-described dispersion 2.

The conductive film-forming composition 2 was applied by bar coating onto a PI (polyimide) substrate to a thickness after drying of 5 μm and dried at 100° C. for 10 minutes to obtain a coating.

The resultant coating was irradiated with pulsed light (photonic sintering system Sinteron 2000 manufactured by Xenon Corporation; irradiation energy: 5 J/cm$^2$; pulse width: 2 ms) to obtain a conductive film.

(Evaluation of Porosity)

A cross section of the obtained conductive film was observed with SEM (magnification: 1,000×) and an obtained image was processed to determine the porosity. More specifically, a cross section of the conductive film in the vertical direction with respect to the conductive film surface (lateral direction: a width of 300 μm; longitudinal direction: a range between a depth position (depth A) corresponding to $25/100$ of the total thickness of the conductive film from its surface (exposed surface) opposite from the other surface facing to a support and a depth position (depth B) corresponding to $75/100$ of the total thickness of the conductive film from its surface opposite from the other surface facing to the support) was observed with SEM to obtain an area ratio (%) of void portions [(void portion area/entire observation area)× 100]. The area ratio was measured at given five positions and the arithmetic mean of the measurements was calculated to obtain a void portion area ratio (porosity). The porosity (%) obtained was evaluated according to the following criteria. From a practical point of view, ratings of A to C are required.

A: Porosity of less than 25%
B: Porosity of 25% or more but less than 45%
C: Porosity of 45% or more but less than 70%
D: Porosity of 70% or more
E: Not evaluable due to brittle film (Evaluation of Electrical Conductivity)

A four point probe resistivity meter was used to measure the volume resistivity of the resultant conductive film, thereby evaluating the electrical conductivity. Evaluation criteria are shown below. From a practical point of view, ratings of A and B are required.

A: Volume resistivity of less than 50 μΩ·cm
B: Volume resistivity of 50 μΩ·cm or more but less than 100 μΩ·cm
C: Volume resistivity of 100 μΩ·cm or more.

Examples 2 to 32 and Comparative Examples 1 to 6

(Dispersion 1)

Mixed were 58 parts by weight of copper(II) oxide particles (manufactured by C. I. Kasei Company, Limited; NanoTek CuO; average primary particle size (48 nm)), 3.5 parts by weight of polyvinylpyrrolidone (manufactured by Polysciences, Inc.; catalog number 24737-250) and 38.5 parts by weight of ion-exchanged water, and the mixture was stirred at 2000 rpm for 5 minutes in a planetary centrifugal mixer (manufactured by Thinky Corporation; THINKY MIXER ARE-310) to thereby obtain a dispersion 1 of Comparative Example 1.

The dispersion 1 was diluted with ion-exchanged water to a copper(II) oxide concentration (copper(II) oxide particle concentration) of 0.01 wt % and the volume average secondary particle size of the dispersion was measured by dynamic light scattering with a Nanotrac particle size distribution measuring device UPA-EX150 (manufactured by Nikkiso Co., Ltd.) in the same manner as for the dispersion 2 of Example 1. The weight-average molecular weight of the polyvinylpyrrolidone as measured was 1000.

(Dispersions 3, 4, 13 to 27)

The same procedure as in the producing method of the dispersion 2 of Example 1 was repeated except that each compositional ratio was changed according to Table 1 to be described later, thereby preparing dispersions 3, 4 and 13 to 27.

(Dispersions 5, 7, 8, 28)

The same procedure as in the producing method of the dispersion 1 was repeated except that each compositional ratio was changed according to Table 1 to be described later, thereby preparing dispersions 5, 7, 8 and 28.

(Dispersion 6)

The same procedure as in the producing method of the dispersion 2 of Example 1 was repeated except that zirconia beads having a diameter of 0.3 mm were used in place of zirconia beads having a bead diameter of 0.05 mm, thereby preparing a dispersion 6.

(Dispersions 9 to 12)

The same procedure as in the producing method of the dispersion 2 of Example 1 was repeated except that each compositional ratio was changed according to Table 1 to be described later and zirconia beads for use were changed to those having a diameter of 0.1 mm, thereby preparing dispersions 9 to 12.

(Preparation of Conductive Film-Forming Compositions 1, 3 to 38)

The same procedure as in the producing method of the conductive film-forming composition 2 of Example 1 was repeated except that the types and the amounts of the dispersion and the ingredients for use were changed according to Table 2, thereby preparing conductive film-forming compositions 1 and 3 to 38.

The same procedure as in Example 1 was repeated to produce conductive films using the resultant conductive film-forming compositions 1 and 3 to 38, and the various evaluations were carried out. All the results are shown in Table 2.

In Table 1, the copper(II) oxide particles A refer to copper(II) oxide (manufactured by C. I. Kasei Company, Limited; NanoTek (registered trademark); average primary particle size (48 nm)) and the copper(II) oxide particles B refer to copper(II) oxide (Sigma-Aldrich; nanopowder (average primary particle size: 35 nm)).

In Tables 1 and 2, values in the "weight-average molecular weight of water-soluble polymer" fields refer to polystyrene-equivalent values obtained by a GPC method (solvent: N-methylpyrrolidone).

In Tables 1 and 2, "%" means "wt %."

The term "balance" in Tables 1 and 2 means that a solvent is contained so that the sum of all ingredients of each dispersion or each composition becomes "100 wt %."

In Tables 1 and 2, "PEG1000 (Wako), PEG4000 (Wako), PEG8000 (Wako) and PEG20000 (Wako)" refer to "polyethylene glycol 1000, polyethylene glycol 4000, polyethylene glycol 8000 and polyethylene glycol 20000" manufactured by Wako Pure Chemical Industries, Ltd., respectively. "BYK-154" refers to "BYK-154" manufactured by BYK Japan KK.

TABLE 1

(Part 1)

| Ingredient | | | Dispersion 1 | Dispersion 2 | Dispersion 3 | Dispersion 4 | Dispersion 5 | Dispersion 6 |
|---|---|---|---|---|---|---|---|---|
| Copper oxide particles | Copper(II) oxide particles A | | 58.0% | 58.0% | 58.0% | 58.0% | 58.0% | 58.0% |
| | Copper(II) oxide particles B | | | | | | | |
| Water-soluble polymer | Type | Weight-average molecular weight of water-soluble polymer | | | | — | | |
| | PVP (Polysciences, Inc.; Catalog No. 24737-250) | 1000 | 3.5% | | | | | |
| | PVP K15 (Tokyo Chemical Industry) | 3000 | | 3.5% | | | | |
| | PVP (Alfa Aesar; Catalog No. A14315) | 20000 | | | 3.5% | | | |
| | PVP K30 (Tokyo Chemical Industry) | 24000 | | | | 3.5% | | 3.5% |
| | PVP K60 (Tokyo Chemical Industry) | 148000 | | | | | 3.5% | |
| | PEG 1000(Wako) | 1000 | | | | | | |
| | PEG 4000(Wako) | 4000 | | | | | | |
| | PEG 8000(Wako) | 13000 | | | | | | |
| | PEG 20000(Wako) | 31000 | | | | | | |
| | BYK-154 (BYK Japan; Solid content concentration: 42%) | — | | | | | | |
| Surfactant | Emulgen 420 (Polyoxyethylene oleyl ether; Kao Corporation) | | | | | | | |
| | Poiz 532A (Polycarboxylic acid type polymeric surfactant; Kao Corporation; Solid content concentration: 40%) | | | | | | | |
| Solvent | Water | | Balance | Balance | Balance | Balance | Balance | Balance |
| | Diethylene glycol | | | | | | | |
| Volume average secondary particle size of copper oxide particles (nm) | | | 250 | 130 | 130 | 130 | 320 | 170 |

(Part 1)

| Ingredient | | | Dispersion 7 | Dispersion 8 | Dispersion 9 | Dispersion 10 | Dispersion 11 |
|---|---|---|---|---|---|---|---|
| Copper oxide particles | Copper(II) oxide particles A | | 58.0% | 58.0% | 50.0% | 50.0% | 50.0% |
| | Copper(II) oxide particles B | | | | | | |
| Water-soluble polymer | Type | Weight-average molecular weight of water-soluble polymer | | | — | | |
| | PVP (Polysciences, Inc.; Catalog No. 24737-250) | 1000 | | | | | |
| | PVP K15 (Tokyo Chemical Industry) | 3000 | | | | | |
| | PVP (Alfa Aesar; Catalog No. A14315) | 20000 | | | | | |
| | PVP K30 (Tokyo Chemical Industry) | 24000 | 2.3% | 1.5% | | | |
| | PVP K60 (Tokyo Chemical Industry) | 148000 | | | | | |
| | PEG 1000(Wako) | 1000 | | | 3.0% | | |
| | PEG 4000(Wako) | 4000 | | | | 3.0% | |
| | PEG 8000(Wako) | 13000 | | | | | 3.0% |
| | PEG 20000(Wako) | 31000 | | | | | |
| | BYK-154 (BYK Japan; Solid content concentration: 42%) | — | | | | | |
| Surfactant | Emulgen 420 (Polyoxyethylene oleyl ether; Kao Corporation) | | | | | | |
| | Poiz 532A (Polycarboxylic acid type polymeric surfactant; Kao Corporation; Solid content concentration: 40%) | | | | | | |
| Solvent | Water | | Balance | Balance | Balance | Balance | Balance |
| | Diethylene glycol | | | | | | |
| Volume average secondary particle size of copper oxide particles (nm) | | | 230 | 260 | 200 | 175 | 165 |

TABLE 1-continued (Part 2)

| | Ingredient | | Dispersion 12 | Dispersion 13 | Dispersion 14 | Dispersion 15 | Dispersion 16 |
|---|---|---|---|---|---|---|---|
| Copper oxide particles | Copper(II) oxide particles A | | 50.0% | 53.0% | 40.0% | 40.0% | 30.0% |
| | Copper(II) oxide particles B | | | | | | |
| Water-soluble polymer | Type | Weight-average molecular weight of water-soluble polymer | | | | — | |
| | PVP (Polysciences, Inc.; Catalog No. 24737-250) | 1000 | | | | | |
| | PVP K15 (Tokyo Chemical Industry) | 3000 | | | | | |
| | PVP (Alfa Aesar; Catalog No. A14315) | 20000 | | | | | |
| | PVP K30 (Tokyo Chemical Industry) | 24000 | | | | 2.4% | 1.8% |
| | PVP K60 (Tokyo Chemical Industry) | 148000 | | 2.7% | | | |
| | PEG 1000(Wako) | 1000 | | | | | |
| | PEG 4000(Wako) | 4000 | | | | | |
| | PEG 8000(Wako) | 13000 | | | | | |
| | PEG 20000(Wako) | 31000 | 3.0% | | | | |
| | BYK-154 (BYK Japan; Solid content concentration: 42%) | — | | | 1.8% | | |
| Surfactant | Emulgen 420 (Polyoxyethylene oleyl ether; Kao Corporation) | | | | 0.5% | | |
| | Poiz 532A (Polycarboxylic acid type polymeric surfactant; Kao Corporation; Solid content concentration: 40%) | | | | | | |
| Solvent | Water | | Balance | Balance | Balance | Balance | Balance |
| | Diethylene glycol | | | | | | |
| Volume average secondary particle size of copper oxide particles (nm) | | | 240 | 130 | 170 | 120 | 120 |

(Part 2)

| | Ingredient | | Dispersion 17 | Dispersion 18 | Dispersion 19 | Dispersion 20 | Dispersion 21 |
|---|---|---|---|---|---|---|---|
| Copper oxide particles | Copper(II) oxide particles A | | 20.0% | 40.0% | 40.0% | 40.0% | 40.0% |
| | Copper(II) oxide particles B | | | | | | |
| Water-soluble polymer | Type | Weight-average molecular weight of water-soluble polymer | | | | — | |
| | PVP (Polysciences, Inc.; Catalog No. 24737-250) | 1000 | | | | | |
| | PVP K15 (Tokyo Chemical Industry) | 3000 | | | | 3.6% | |
| | PVP (Alfa Aesar; Catalog No. A14315) | 20000 | | | | | |
| | PVP K30 (Tokyo Chemical Industry) | 24000 | 1.2% | | | | 3.6% |
| | PVP K60 (Tokyo Chemical Industry) | 148000 | | | | | |
| | PEG 1000(Wako) | 1000 | | | | | |
| | PEG 4000(Wako) | 4000 | | | | | |
| | PEG 8000(Wako) | 13000 | | | | | |
| | PEG 20000(Wako) | 31000 | | | | | |
| | BYK-154 (BYK Japan; Solid content concentration: 42%) | — | | | | | |
| Surfactant | Emulgen 420 (Polyoxyethylene oleyl ether; Kao Corporation) | | | 1.2% | 3.2% | 1.2% | 1.2% |
| | Poiz 532A (Polycarboxylic acid type polymeric surfactant; Kao Corporation; Solid content concentration: 40%) | | | | | | |
| Solvent | Water | | Balance | Balance | Balance | Balance | Balance |
| | Diethylene glycol | | | | | | |
| Volume average secondary particle size of copper oxide particles (nm) | | | 120 | 120 | 130 | 120 | 120 |

TABLE 1-continued (Part 3)

| | Ingredient | | Dispersion 22 | Dispersion 23 | Dispersion 24 | Dispersion 25 | Dispersion 26 | Dispersion 27 | Dispersion 28 |
|---|---|---|---|---|---|---|---|---|---|
| Copper oxide particles | Copper(II) oxide particles A | | 40.0% | 40.0% | 40.0% | | | 40.0% | 65.0% |
| | Copper(II) oxide particles B | | | | | 20.0% | 20.0% | | |
| Water-soluble polymer | Type | Weight-average molecular weight of water-soluble polymer | | | | | — | | |
| | PVP (Polysciences, Inc.; Catalog No. 24737-250) | 1000 | | | | | | | |
| | PVP K15 (Tokyo Chemical Industry) | 3000 | | | | | | | |
| | PVP (Alfa Aesar; Catalog No. A14315) | 20000 | | | | | | | |
| | PVP K30 (Tokyo Chemical Industry) | 24000 | | | | | | | |
| | PVP K60 (Tokyo Chemical Industry) | 148000 | | | | | | | |
| | PEG 1000(Wako) | 1000 | 3.6% | | | | | | |
| | PEG 4000(Wako) | 4000 | | 3.6% | | | | | |
| | PEG 8000(Wako) | 13000 | | | 3.6% | | | 4.8% | |
| | PEG 20000(Wako) | 31000 | | | | | | | |
| | BYK-154 (BYK Japan; Solid content concentration: 42%) | — | | | | | | | |
| Surfactant | Emulgen 420 (Polyoxyethylene oleyl ether; Kao Corporation) | | 1.2% | 1.2% | 1.2% | | | | |
| | Poiz 532A (Polycarboxylic acid type polymeric surfactant; Kao Corporation; Solid content concentration: 40%) | | | | | 1.5% | 4.0% | | |
| Solvent | Water | | Balance | Balance | Balance | Balance | Balance | | Balance |
| | Diethylene glycol | | | | | | | Balance | |
| Volume average secondary particle size of copper oxide particles (nm) | | | 150 | 150 | 150 | 160 | 160 | 170 | 350 |

TABLE 2

(Part 1)

| | | | CE1 | EX1 | EX2 | EX3 | CE2 | EX4 | EX5 |
|---|---|---|---|---|---|---|---|---|---|
| Type of conductive film-forming composition | | | Composition 1 | Composition 2 | Composition 3 | Composition 4 | Composition 5 | Composition 6 | Composition 7 |
| Type of dispersion for use | | | Dispersion 1 | Dispersion 2 | Dispersion 3 | Dispersion 4 | Dispersion 5 | Dispersion 4 | Dispersion 2 |
| Copper oxide particles | | | 50.00% | 50.00% | 50.00% | 50.00% | 50.00% | 50.00% | 50.00% |
| Water-soluble polymer | Type | Weight-average molecular weight of water-soluble polymer | | | | | — | | |
| | PVP (Polysciences, Inc.; Catalog No. 24737-250) | 1000 | 6.00% | | | | | | |
| | PVP K15 (Tokyo Chemical Industry) | 3000 | | 6.00% | | | | | 3.00% |
| | PVP (Alfa Aesar; Catalog No. A14315) | 20000 | | | 6.00% | | | | |
| | PVP K30 (Tokyo Chemical Industry) | 24000 | | | | 6.00% | | 3.00% | |
| | PVP K60 (Tokyo Chemical Industry) | 148000 | | | | | 6.00% | 3.00% | 3.00% |
| | PEG 1000(Wako) | 1000 | | | | | | | |
| | PEG 4000(Wako) | 4000 | | | | | | | |
| | PEG 8000(Wako) | 13000 | | | | | | | |
| | PEG 20000(Wako) | 31000 | | | | | | | |
| | BYK-154 (BYK Japan; Solid content concentration: 42%) | — | | | | | | | |
| Surfactant | Emulgen 420 (Polyoxyethylene oleyl ether; Kao Corporation) | | | | | | | | |
| | Poiz 532A (Polycarboxylic acid type polymeric surfactant; Kao Corporation; Solid content concentration: 40%) | | | | | | | | |

TABLE 2-continued (Part 1 continued top portion)

| | | | | | | | | |
|---|---|---|---|---|---|---|---|---|
| Thixotropic agent | BYK-425 | | 2.00% | 2.00% | 2.00% | 2.00% | 2.00% | 2.00% | 2.00% |
| Solvent | Water | | Balance | Balance | Balance | Balance | Balance | Balance | Balance |
| | Diethylene glycol | | | | | | | | |
| Volume average secondary particle size of copper oxide particles (nm) | | | 250 | 130 | 130 | 130 | 320 | 130 | 130 |
| Evaluation | Porosity evaluation | | E | B | B | B | E | A | A |
| | Conductivity evaluation | | C | B | A | A | C | A | A |

(Part 1)

| | | | EX6 | EX7 | CE3 | EX8 | EX9 | EX10 |
|---|---|---|---|---|---|---|---|---|
| Type of conductive film-forming composition | | | Composition 8 | Composition 9 | Composition 10 | Composition 11 | Composition 12 | Composition 13 |
| Type of dispersion for use | | | Dispersion 6 | Dispersion 7 | Dispersion 8 | Dispersion 9 | Dispersion 10 | Dispersion 11 |
| Copper oxide particles | | | 50.00% | 50.00% | 50.00% | 35.00% | 35.00% | 35.00% |
| Water-soluble polymer | Type | Weight-average molecular weight of water-soluble polymer | | | | | | |
| | PVP (Polysciences, Inc.; Catalog No. 24737-250) | 1000 | | | | | | |
| | PVP K15 (Tokyo Chemical Industry) | 3000 | | | | | | |
| | PVP (Alfa Aesar; Catalog No. A14315) | 20000 | | | | | | |
| | PVP K30 (Tokyo Chemical Industry) | 24000 | 3.00% | 3.00% | 3.00% | | | |
| | PVP K60 (Tokyo Chemical Industry) | 148000 | 3.00% | 3.00% | 3.00% | | | |
| | PEG 1000(Wako) | 1000 | | | | 4.20% | | |
| | PEG 4000(Wako) | 4000 | | | | | 4.20% | |
| | PEG 8000(Wako) | 13000 | | | | | | 4.20% |
| | PEG 20000(Wako) | 31000 | | | | | | |
| | BYK-154 (BYK Japan; Solid content concentration: 42%) | — | | | | | | |
| Surfactant | Emulgen 420 (Polyoxyethylene oleyl ether; Kao Corporation) | | | | | | | |
| | Poiz 532A (Polycarboxylic acid type polymeric surfactant; Kao Corporation; Solid content concentration: 40%) | | | | | | | |
| Thixotropic agent | BYK-425 | | 2.00% | 2.00% | 2.00% | 1.40% | 1.40% | 1.40% |
| Solvent | Water | | Balance | Balance | Balance | Balance | Balance | Balance |
| | Diethylene glycol | | | | | | | |
| Volume average secondary particle size of copper oxide particles (nm) | | | 170 | 230 | 260 | 200 | 175 | 165 |
| Evaluation | Porosity evaluation | | B | C | D | C | B | B |
| | Conductivity evaluation | | B | B | C | B | B | A |

(Part 2)

| | | | EX11 | EX12 | EX13 | EX14 | EX15 | EX16 | EX17 |
|---|---|---|---|---|---|---|---|---|---|
| Type of conductive film-forming composition | | | Composition 14 | Composition 15 | Composition 16 | Composition 17 | Composition 18 | Composition 19 | Composition 20 |
| Type of dispersion for use | | | Dispersion 12 | Dispersion 13 | Dispersion 14 | Dispersion 15 | Dispersion 16 | Dispersion 17 | Dispersion 18 |
| Copper oxide particles | | | 35.00% | 50.00% | 35.00% | 35.00% | 25.00% | 15.00% | 35.00% |
| Water-soluble polymer | Type | Weight-average molecular weight of water-soluble polymer | | | | | | | |
| | PVP (Polysciences, Inc.; Catalog No. 24737-250) | 1000 | | | | | | | |
| | PVP K15 (Tokyo Chemical Industry) | 3000 | | | | | | | |
| | PVP (Alfa Aesar; Catalog No. A14315) | 20000 | | | | | | | |
| | PVP K30 (Tokyo Chemical Industry) | 24000 | | | | | 2.10% | 1.50% | 0.90% |
| | PVP K60 (Tokyo Chemical Industry) | 148000 | | 5.53% | 3.60% | 2.10% | 1.50% | 0.90% | 3.20% |
| | PEG 1000(Wako) | 1000 | | | | | | | |
| | PEG 4000(Wako) | 4000 | | | | | | | |

TABLE 2-continued

| | | | | | | | | | |
|---|---|---|---|---|---|---|---|---|---|
| | PEG 8000(Wako) | 13000 | | | | | | | |
| | PEG 20000(Wako) | 31000 | 4.20% | | | | | | |
| | BYK-154 (BYK Japan; Solid content concentration: 42%) | — | | | 1.60% | | | | |
| Surfactant | Emulgen 420 (Polyoxyethylene oleyl ether; Kao Corporation) | | | 0.47% | | | | | 1.05% |
| | Poiz 532A (Polycarboxylic acid type polymeric surfactant; Kao Corporation; Solid content concentration: 40%) | | | | | | | | |
| Thixotropic agent | BYK-425 | | 1.40% | 2.00% | 1.40% | 1.40% | 1.00% | 0.60% | 1.40% |
| Solvent | Water | | Balance | Balance | Balance | Balance | Balance | Balance | Balance |
| | Diethylene glycol | | | | | | | | |
| Volume average secondary particle size of copper oxide particles (nm) | | | 240 | 130 | 170 | 120 | 120 | 120 | 120 |
| Evaluation | Porosity evaluation | | C | A | B | A | B | B | A |
| | Conductivity evaluation | | B | A | B | A | A | A | A |

(Part 2)

| | | | EX18 | EX19 | EX20 | EX21 | EX22 | EX23 |
|---|---|---|---|---|---|---|---|---|
| Type of conductive film-forming composition | | | Composition 21 | Composition 22 | Composition 23 | Composition 24 | Composition 25 | Composition 26 |
| Type of dispersion for use | | | Dispersion 19 | Dispersion 20 | Dispersion 21 | Dispersion 22 | Dispersion 23 | Dispersion 24 |
| Copper oxide particles | | | 35.00% | 35.00% | 35.00% | 35.00% | 35.00% | 35.00% |
| Water-soluble polymer | Type | Weight-average molecular weight of water-soluble polymer | | | | | | |
| | PVP (Polysciences, Inc.; Catalog No. 24737-250) | 1000 | | | | | | |
| | PVP K15 (Tokyo Chemical Industry) | 3000 | | 3.15% | | | | |
| | PVP (Alfa Aesar; Catalog No. A14315) | 20000 | | | | | | |
| | PVP K30 (Tokyo Chemical Industry) | 24000 | | | 3.15% | | | |
| | PVP K60 (Tokyo Chemical Industry) | 148000 | 1.40% | | | | | |
| | PEG 1000(Wako) | 1000 | | | | 3.15% | | |
| | PEG 4000(Wako) | 4000 | | | | | 3.15% | |
| | PEG 8000(Wako) | 13000 | | | | | | 3.15% |
| | PEG 20000(Wako) | 31000 | | | | | | |
| | BYK-154 (BYK Japan; Solid content concentration: 42%) | — | | | | | | |
| Surfactant | Emulgen 420 (Polyoxyethylene oleyl ether; Kao Corporation) | | 2.80% | 1.05% | 1.05% | 1.05% | 1.05% | 1.05% |
| | Poiz 532A (Polycarboxylic acid type polymeric surfactant; Kao Corporation; Solid content concentration: 40%) | | | | | | | |
| Thixotropic agent | BYK-425 | | 1.40% | 1.40% | 1.40% | 1.40% | 1.40% | 1.40% |
| Solvent | Water | | Balance | Balance | Balance | Balance | Balance | Balance |
| | Diethylene glycol | | | | | | | |
| Volume average secondary particle size of copper oxide particles (nm) | | | 130 | 120 | 120 | 150 | 150 | 150 |
| Evaluation | Porosity evaluation | | C | C | B | C | C | B |
| | Conductivity evaluation | | B | B | A | B | B | B |

(Part 3)

| | | | EX24 | EX25 | EX26 | EX27 | EX28 | EX29 |
|---|---|---|---|---|---|---|---|---|
| Type of conductive film-forming composition | | | Composition 27 | Composition 28 | Composition 29 | Composition 30 | Composition 31 | Composition 32 |
| Type of dispersion for use | | | Dispersion 25 | Dispersion 26 | Dispersion 25 | Dispersion 25 | Dispersion 25 | Dispersion 25 |
| Copper oxide particles | | | 15.00% | 15.00% | 15.00% | 15.00% | 15.00% | 15.00% |
| Water-soluble polymer | Type | Weight-average molecular weight of water-soluble polymer | | | | | | |
| | PVP (Polysciences, Inc.; Catalog No. 24737-250) | 1000 | | | | | | |

TABLE 2-continued

| | | | | | | | | |
|---|---|---|---|---|---|---|---|---|
| | PVP K15 (Tokyo Chemical Industry) | 3000 | | | 1.35% | | | |
| | PVP (Alfa Aesar; Catalog No. A14315) | 20000 | | | | | | |
| | PVP K30 (Tokyo Chemical Industry) | 24000 | | | | | 1.35% | |
| | PVP K60 (Tokyo Chemical Industry) | 148000 | 1.35% | 1.35% | | | | |
| | PEG 1000(Wako) | 1000 | | | | | 1.35% | |
| | PEG 4000(Wako) | 4000 | | | | | | 1.35% |
| | PEG 8000(Wako) | 13000 | | | | | | |
| | PEG 20000(Wako) | 31000 | | | | | | |
| | BYK-154 (BYK Japan; Solid content concentration: 42%) | — | | | | | | |
| Surfactant | Emulgen 420 (Polyoxyethylene oleyl ether; Kao Corporation) | | | | | | | |
| | Poiz 532A (Polycarboxylic acid type polymeric surfactant; Kao Corporation; Solid content concentration: 40%) | | 1.13% | 3.00% | 1.13% | 1.13% | 1.13% | 1.13% |
| Thixotropic agent | BYK-425 | | 0.60% | 0.60% | 0.60% | 0.60% | 0.60% | 0.60% |
| Solvent | Water | | Balance | Balance | Balance | Balance | Balance | Balance |
| | Diethylene glycol | | | | | | | |
| Volume average secondary particle size of copper oxide particles (nm) | | | 160 | 160 | 160 | 160 | 160 | 160 |
| Evaluation | Porosity evaluation | | B | C | C | B | C | B |
| | Conductivity evaluation | | A | B | B | B | B | B |

(Part 3)

| | | | EX30 | EX31 | EX32 | CE4 | CE5 | CE6 |
|---|---|---|---|---|---|---|---|---|
| Type of conductive film-forming composition | | | Composition 33 | Composition 34 | Composition 35 | Composition 36 | Composition 37 | Composition 38 |
| Type of dispersion for use | | | Dispersion 25 | Dispersion 13 | Dispersion 4 | Dispersion 27 | Dispersion 28 | Dispersion 28 |
| Copper oxide particles | | | 15.00% | 50.00% | 50.00% | — | 50.00% | 50.00% |
| Water-soluble polymer | Type | Weight-average molecular weight of water-soluble polymer | | | | | | |
| | PVP (Polysciences, Inc.; Catalog No. 24737-250) | 1000 | | | | | | |
| | PVP K15 (Tokyo Chemical Industry) | 3000 | | | | | | 6.00% |
| | PVP (Alfa Aesar; Catalog No. A14315) | 20000 | | | | | | |
| | PVP K30 (Tokyo Chemical Industry) | 24000 | | | 3.00% | | | |
| | PVP K60 (Tokyo Chemical Industry) | 148000 | | 5.53% | 3.00% | | 6.00% | |
| | PEG 1000(Wako) | 1000 | | | | | | |
| | PEG 4000(Wako) | 4000 | | | | | | |
| | PEG 8000(Wako) | 13000 | 1.35% | | | 6.00% | | |
| | PEG 20000(Wako) | 31000 | | | | | | |
| | BYK-154 (BYK Japan; Solid content concentration: 42%) | — | | | | | | |
| Surfactant | Emulgen 420 (Polyoxyethylene oleyl ether; Kao Corporation) | | | | 0.47% | | | |
| | Poiz 532A (Polycarboxylic acid type polymeric surfactant; Kao Corporation; Solid content concentration: 40%) | | 1.13% | | | | | |
| Thixotropic agent | BYK-425 | | 0.60% | | | 1.40% | 2.00% | 2.00% |
| Solvent | Water | | Balance | Balance | Balance | Balance | Balance | Balance |
| | Diethylene glycol | | | | | | | |
| Volume average secondary particle size of copper oxide particles (nm) | | | 160 | 130 | 130 | 170 | 350 | 350 |
| Evaluation | Porosity evaluation | | B | C | C | D | D | E |
| | Conductivity evaluation | | B | B | B | C | C | C |

As is seen in Table 2, it was confirmed that when the conductive film-forming composition of the invention is used, the resultant conductive film has less voids and excellent electrical conductivity.

In particular, as is clear from the comparison of Examples 1 to 3, it was confirmed that when the weight-average molecular weight of the polyvinylpyrrolidone is 8000 or more, the conductive film has more excellent electrical conductivity.

As is clear from the comparison of Examples 3 and 4, it was confirmed that when polyvinylpyrrolidones different in weight-average molecular weight are used, the conductive film has further reduced voids.

As is clear from the comparison of Examples 4, 6 and 7, it was confirmed that when the volume average secondary particle size is up to 180 nm, the conductive film has further reduced voids and when the volume average secondary particle size is up to 160 nm, the conductive film has yet further reduced voids.

As is clear from the comparison of Examples 8 to 11, it was confirmed that when the weight-average molecular weight of the polyethylene glycol is 3000 or more but not more than 18000, a copper oxide dispersion with a small volume average secondary particle size is obtained and the conductive film has further reduced voids and moreover, when the weight-average molecular weight is 5000 or more but not more than 18000, the conductive film has further excellent electrical conductivity.

As is clear from the comparison of Examples 14 to 16, it was confirmed that the conductive film-forming composition with a higher copper oxide particle concentration leads to the reduction in voids.

As is clear from the comparison of Comparative Example 2 and Example 12, it was confirmed that when, in addition to the water-soluble polymer, the surfactant is used as the dispersant, a copper oxide dispersion with a small volume average secondary particle size is obtained and the conductive film has even less voids and excellent electrical conductivity.

As is clear from the comparison of Examples 17 and 18 and the comparison of Examples 24 and 25, it was confirmed that when the surfactant amount is up to 5 wt % with respect to the total weight of the copper oxide particles, the conductive film has reduced voids and excellent electrical conductivity.

It was confirmed from the comparison of Examples 19 and 20 that when the polyvinylpyrrolidone having a molecular weight of at least 20000 and the surfactant are contained, the conductive film has further reduced voids.

It was confirmed from the comparison of Examples 12 and 31 and the comparison of Examples 4 and 32 that when the thixotropic agent is contained, the conductive film has further reduced voids and more excellent electrical conductivity.

On the other hand, as is clear from Comparative Examples 1 to 3, 5 and 6, it was confirmed that when the copper oxide particles have a volume average secondary particle size out of a predetermined range, the conductive film has many voids and poor electrical conductivity.

As is clear from Comparative Example 4, it was confirmed that when an organic solvent is used as the solvent, the conductive film has many voids and poor electrical conductivity. The configuration of Comparative Example 4 corresponds to that of JP 2004-155638 A described above.

What is claimed is:

1. A conductive film-forming composition comprising copper oxide particles, water, and a dispersant,
    wherein the copper oxide particles have a volume average secondary particle size of 20 to 240 nm,
    the copper oxide particles are contained in an amount of 10 to 70 wt % with respect to a total weight of the conductive film-forming composition,
    the dispersant contains two or more types of water-soluble polymers different in weight-average molecular weight, and
    the water-soluble polymers are polyvinylpyrrolidone.

2. The conductive film-forming composition according to claim 1, further comprising a thixotropic agent.

3. The conductive film-forming composition according to claim wherein the dispersant further contains a surfactant.

4. The conductive film-forming composition according to claim 2, wherein the dispersant contains polyvinylpyrrolidone with a weight-average molecular weight of 8000 to 16000.

5. The conductive film-forming composition according to claim 2, wherein the dispersant is contained in an amount of 4 to 20 wt % with respect to a total weight of the copper oxide particles.

6. The conductive film-forming composition according to claim 2, wherein the copper oxide particles have a volume average secondary particle size of 20 to 180 nm.

7. The conductive film-forming composition according to claim 1, wherein the dispersant further contains a surfactant.

8. The conductive film-forming composition according to claim 7, wherein the dispersant contains polyvinylpyrrolidone with a weight-average molecular weight of 8000 to 160000.

9. The conductive film-forming composition according to claim 7, wherein the dispersant is contained in an amount of 4 to 20 wt % with respect to a total weight of the copper oxide particles.

10. The conductive film-forming composition according to claim 7, wherein the copper oxide particles have a volume average secondary particle size of 20 to 180 nm.

11. The conductive film-forming composition according to claim 1, wherein the dispersant contains polyvinylpyrrolidone with a weight-average molecular weight of 8000 to 160000.

12. The conductive film-forming composition according to claim 11, wherein the dispersant is contained in an amount of 4 to 20 wt % with respect to a total weight of the copper oxide particles.

13. The conductive film-forming composition according to claim 1, wherein the dispersant is contained in an amount of 4 to 20 wt % with respect to a total weight of the copper oxide particles.

14. The conductive film-forming composition according to claim 1, wherein the copper oxide particles have a volume average secondary particle size of 20 to 180 nm.

15. A conductive film producing method, comprising:
    a step of forming a coating by applying the conductive film-forming composition according to claim 1 onto a substrate; and
    a step of forming a metallic copper-containing conductive film by performing heating treatment and/or light irradiation treatment on the coating to reduce the copper oxide particles.

16. A conductive film-forming composition comprising copper oxide particles, water, and a dispersant, wherein
    the copper oxide particles have a volume average secondary particle size of 20 to 240 nm, the copper oxide particles are contained in an amount of 10 to 70 wt©© with respect to a total weight of the conductive film-forming composition, and the dispersant contains polyethylene glycol and a surfactant.

17. The conductive film-forming composition according to claim 16, wherein the weight-average molecular weight of the polyethylene glycol is 3000 to 40000.

\* \* \* \* \*